V. DI SANTE.
AIR FILTER.
APPLICATION FILED DEC. 24, 1917.

1,288,393.

Patented Dec. 17, 1918.

Inventor
Vito Di Sante.
By McGill and Maguire
His Attorneys

UNITED STATES PATENT OFFICE.

VITO DI SANTE, OF WICHITA, KANSAS.

AIR-FILTER.

1,288,393.  Specification of Letters Patent.  Patented Dec. 17, 1918.

Application filed December 24, 1917. Serial No. 208,655.

*To all whom it may concern:*

Be it known that I, VITO DI SANTE, of Wichita, in the county of Sedgwick and State of Kansas, have invented certain new and useful Improvements in Air-Filters; and I do hereby declare the following to be a full, clear, and exact description of the invention, such as will enable others skilled in the art to which it appertains to make and use the same.

My invention relates to air purifying apparatus and the object is to provide an improved, simple and highly efficient device of this character which is particularly adapted for use in connection with internal combustion engines, either of the stationary type, or such as are used for driving automobiles.

Figure 1:
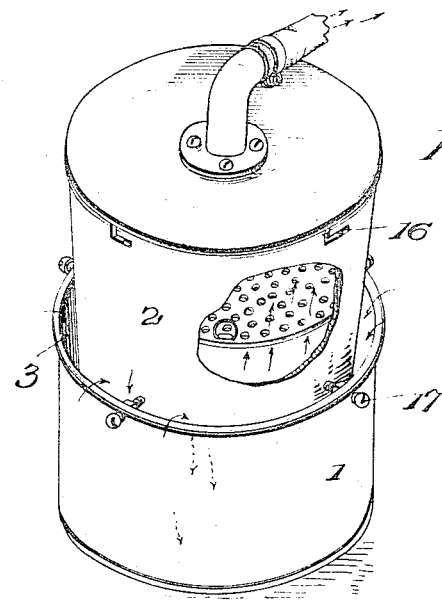
Figure 2:
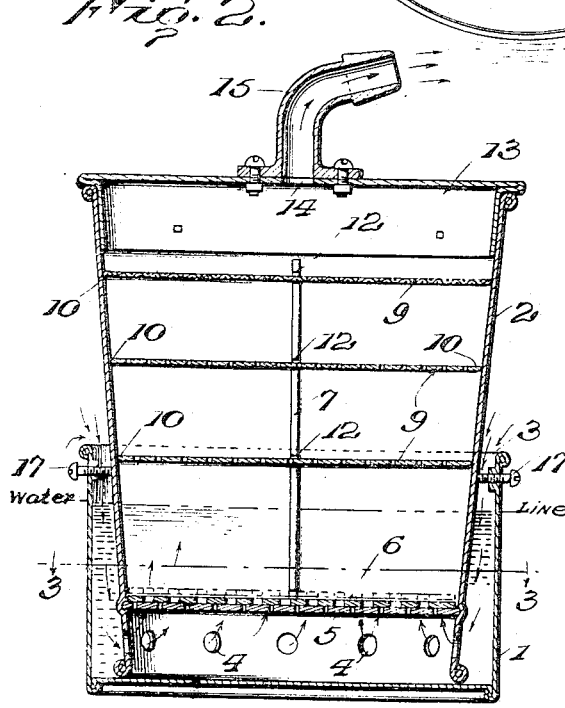
Figure 3:
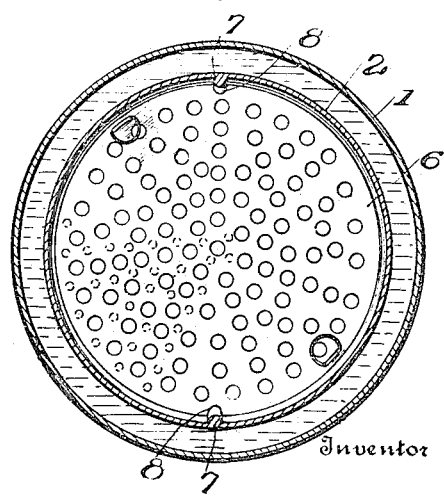

In the accompanying drawing, Figure 1 is a view in perspective of an apparatus embodying my invention, with parts broken away. Fig. 2 is a central vertical sectional view. Fig. 3 is a sectional view on line 3—3, Fig. 2.

Referring to the drawings, 1 designates an open top container which is adapted to receive and hold a quantity of water and within which is fitted the lower end of a collecting vessel 2. The latter is of inverted truncated cone shape and that portion fitting within the container is of such diameter as to provide an open space 3 between the vessel and the container at all points and through which air may be entrained. Near its lower end the vessel is provided with a plurality of openings 4, and above these openings and fixedly secured to the vessel is a perforated plate 5 which, with a second perforated plate 6 superposed on the first plate, forms the bottom of the vessel. The openings of these two plates are out of line with each other so that when the plates are in contact they form a closure for the bottom of the vessel. The plate 6 is vertically movable and to provide appropriate guides and insure against axial turning of the plate I provide the inner walls of the vessel with vertically disposed ribs 7 which are received in notches 8 of the second plate 6. Above the plates 5 and 6 and spaced therefrom and from each other are additional screening plates 9. Any desired material may be used in forming these screen members, such as perforated metal, wire mesh, or other filtering media. The two intermediate plates are shown of perforated metal while the uppermost plate is of cloth-like fabric. Each of the plates 9 is provided with diametrically disposed notches 10 which receive the ribs 7. The continuity of each of the ribs is interrupted as at 12 to provide for the ready turning of the plates 9 so that the plates may be locked as against vertical movement.

The upper end of the vessel is closed by a cover 13 which has a centrally disposed opening 14 which is alined with an elbow joint 15 with which connection may be made to a carbureter (not shown). The cover may be locked as against accidental displacement by a bayonet lock 16. A series of screws 17 passed through the container are adapted to engage the vessel and hold it in appropriate spaced relation to the container.

My device may be readily attached to the air inlet of a carbureter and upon suction being created will effect an induction of the air between the walls of the container and the vessel and up through the water in the vessel, the suction drawing the water from the container well up into the lower portion of the vessel, the plates 5 and 6 having been separated by such suction. The air after passing through the water will be largely freed of impurities and such foreign substances as may be carried therethrough will be effectively filtered by the series of filtering screens or plates located above the water line, thus insuring a thorough cleaning and moistening of the air before it reaches the carbureter.

I claim as my invention:

1. In an air filter, the combination with a liquid container, of a collecting vessel mounted in said container and provided near its lower end with a plurality of openings, a perforated plate forming the bottom of said vessel and fixedly secured thereto above said openings, a second perforated plate superposed on the first mentioned plate, the openings of said second plate being out of line with the openings of said first plate, said plates being adapted to be separated by the suction drawing the air through the vessel.

2. Means for filtering air including an open top liquid container, a collecting vessel having a portion fitting in said container and provided near its lower end with a plurality of openings, said vessel being spaced from the side walls of said container, a perforated plate forming the bottom of said vessel and fixedly secured thereto above said openings, a second perforated plate superposed on the first mentioned plate and having diametrically disposed notches, the openings in said second plate being out of line with the openings of said first plate, and vertically disposed ribs on the inner walls of said vessel forming guides for said second perforated plate, the latter being adapted to be separated from said bottom plate during the passage of air through the vessel.

3. Means for filtering air including an open top liquid container, a collecting vessel having a portion fitting in said container and provided near its lower end with a plurality of openings, said vessel being spaced from the side walls of said container, a perforated plate forming the bottom of said vessel and fixedly secured thereto above said openings, a second perforated plate superposed on the first mentioned plate and having diametrically disposed notches, the openings of said second plate being out of line with the openings of said first plate, said plates being adapted to be separated during the passage of air through the vessel, a plurality of spaced apart screening plates above said perforated bottom plates, and vertically disposed ribs on the inner walls of said vessel forming guides for said second perforated plate and said screening plates, the notches of said several plates taking in said ribs, the continuity of said ribs being broken to permit said screening plates to be turned so as to prevent vertical movement during operation of the device.

In testimony whereof, I have signed this specification.

VITO DI SANTE.